United States Patent

Grabill, Jr. et al.

[15] 3,696,615

[45] Oct. 10, 1972

[54] HYDRAULIC HOLD-OFF FOR A MECHANICAL FEED-BACK SYSTEM

[72] Inventors: Paul J. Grabill, Jr., Sterling Heights; David J. Suttkus, Warren, both of Mich.

[73] Assignee: TRW Inc., Cleveland, Ohio

[22] Filed: Jan. 18, 1971

[21] Appl. No.: 107,108

[52] U.S. Cl. ............. 60/54.6 P, 60/54.6 R, 91/391 R
[51] Int. Cl. ......................... F15b 7/00, F15b 13/10
[58] Field of Search ............. 60/54.5, 54.6 P, 54.6 R; 91/434, 391 R

[56] References Cited

UNITED STATES PATENTS

| | | | |
|---|---|---|---|
| 3,269,784 | 8/1966 | Bueler | 91/431 |
| 2,757,512 | 8/1956 | Foreman | 60/54.6 P |

FOREIGN PATENTS OR APPLICATIONS

| | | | |
|---|---|---|---|
| 1,430,353 | 11/1968 | Germany | 60/54.6 P |

Primary Examiner—Martin P. Schwadron
Assistant Examiner—A. M. Zupcic
Attorney—Hill, Sherman, Meroni, Gross & Simpson

[57] ABSTRACT

A movable sleeve is pushed against a stop by hydraulic pressure supplied to a pressure chamber during the hydraulic power curve. A continuous biasing means such as a spring feeds back force proportionally while it is supported by such hydraulic pressure. During a time when there is insufficient force to act against the sleeve, the spring together with its associated actuating elements picks up the sleeve and carries it along. The cavity within which the sleeve moves permits enough travel to form a mechanical train link without picking up the force reaction spring, thereby solving the problem of accumulating the undesirable force when pushing through in a fail-safe operation.

6 Claims, 2 Drawing Figures

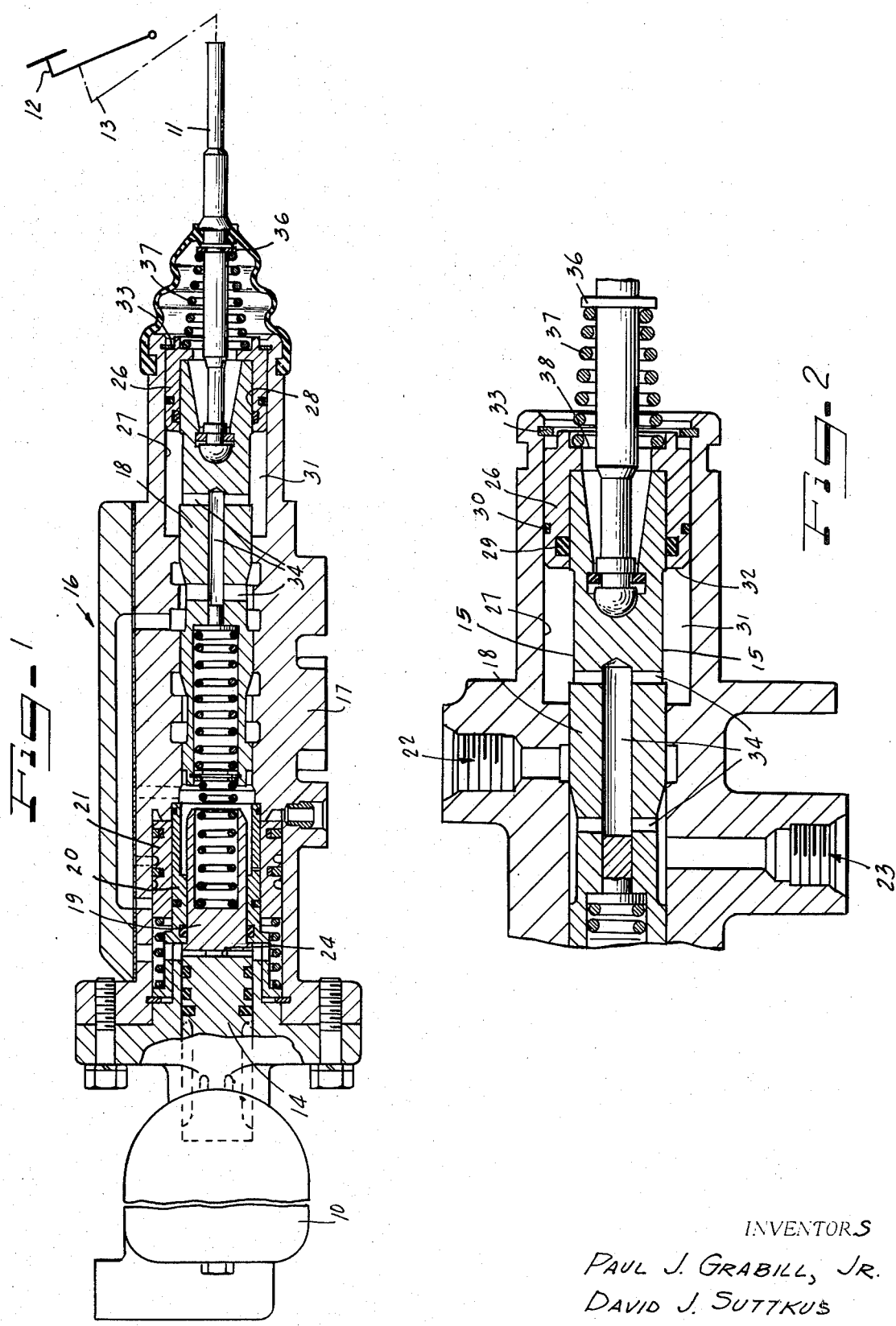

HYDRAULIC HOLD-OFF FOR A MECHANICAL FEED-BACK SYSTEM

BACKGROUND OF THE INVENTION

1. Field of the Invention

This invention relates generally to power brake systems and more particularly to a hydraulic power brake booster wherein a feed-back system is utilized in connection with the application of hydraulic force to a master cylinder piston.

2. The Prior Art

In order to give an operator or driver the "feel" in his brake pedal, it is sometimes contemplated that the feed-back function be performed by a mechanical compression spring. However, if a fail-safe operation is contemplated or if the hydraulic brake master cylinder is to be mechanically stroked, it is then necessary to overcome the undesirable force of accumulated spring compression. The present invention is provided to solve that problem.

SUMMARY OF THE INVENTION

In accordance with the principles of the present invention, a master cylinder piston and an operator actuated push rod are separated by a plurality of valve elements for controlling the application of hydraulic force from an external source to the master cylinder piston.

The hydraulic booster of which the various valve elements constitute a part includes a movable sleeve which, during the hydraulic power curve, is pushed against a stop by hydraulic pressure produced in a cavity of which one end of the movable sleeve forms a pressure motive surface.

A coil spring is provided between the movable sleeve and the push rod and feeds back force proportionally while it is supported by hydraulic pressure in the cavity. During a time when there is insufficient force to act against the sleeve, a movable spool valve element located radially inwardly of the sleeve moves forward axially and the coil spring takes up the sleeve and carries it along. The cavity in which the sleeve moves permits enough travel to bottom the master cylinder piston and still not pick up the force reaction spring. Thus, a solid mechanical train link is provided between the master cylinder piston and the push rod, thereby accomplishing a hydraulic hold-off for the mechanical feedback system without encountering undesirable accumulated spring forces.

DESCRIPTION OF THE DRAWINGS

FIG. 1 is a cross-sectional view of a power booster interposed between a master brake cylinder and a push rod and showing the principles of the present invention applied to such a system.

FIG. 2 is an enlarged partial sectional view generally similar to FIG. 1 but showing the parts in different position due to a reduction in hydraulic pressure.

BRIEF DESCRIPTION OF PREFERRED EMBODIMENTS

The feedback function in a power brake gives the driver the "feel" in his brake pedal. In a hydraulic power brake booster, the feedback system, which offers many advantages, is one which uses a mechanical compression spring. In order to have a wire spring perform this feedback function, it must have a mechanical spring rate proportionally smaller than the rate at which hydraulic force is applied to the master cylinder piston.

In one form of braking system and in connection with which the present invention finds a particular utility, the rate at which hydraulic force is applied to the master cylinder piston is rather high and, accordingly, even though the mechanical spring rate is only a small fraction of the total, it is still in the upper spring rate range of approximately 600 pounds per inch. The effect of such a spring rate on a fail-safe push-through capability of the unit is to have a net loss of force many times the permissible amount before any force can be added to the master cylinder. Accordingly, it is contemplated by the present invention that the problem of accumulating the undesirable force when "pushing through" or mechanically stroking the master cylinder can be avoided.

In the exemplary form of the present invention, a master cylinder is shown at 10 and a push rod is shown at 11 which is adapted to be actuated by a foot pedal 12 through any appropriate driving connection such as a linkage shown at 13.

The master cylinder 10 has a master cylinder piston 14 and upon actuation of the master cylinder piston 14, pressure will be furnished to the brake actuating motors of either or both the front and rear wheels of the vehicle.

Interposed between the master cylinder piston 14 and the push rod 11, as shown in FIG. 1, is a hydraulic booster shown generally at 16. The details of the hydraulic booster 16 are not necessary to a complete understanding of the principles of the present invention and, accordingly, suffice it to say that there is provided a booster body 17 and a plurality of valve elements including a throttle valve formed by a spool valve member 18, a concentric valve 19, a sleeve valve 20 and a governor shift valve 21. The body 17 is formed with a plurality of lands and recesses and the various valve elements are formed with corresponding control sections so that pressure supplied from an external source and connected to the booster 16 via passages shown at 22 and 23 in FIG. 2 may be selectively applied to the motive surface 24 on the end of the master cylinder piston 14.

In accordance with the principles of the present invention, a movable sleeve is provided at 26 and such sleeve is slidably supported on its external peripheral surface in a counterbore 27 formed in an end of the booster 16.

The throttle valve 18 is slidably received within a bore 28 of the sleeve 26. An internal O-ring sealing member 29 and an external O-ring sealing member 30 is carried by the sleeve member 26 for accomplishing a sealed relationship between the parts.

Formed between the throttle valve 18 and the counterbore 27 is a pressure chamber 31 which receives pressure from the external source therein. An end of the sleeve member 26, as shown at 32, forms a motive surface of the recess or chamber 31 and is thus pressure-loaded so that the sleeve is pushed against a stop formed by a lock ring 33 carried in the end of the counterbore 27. It will be appreciated that pressure is communicated to the recess or chamber 31 by means of the passage shown at 34. A flat 15 is formed on the throttle valve 18 to drain the chamber 31 so as not to accumulate hydraulic fluid when passage 34 is closed off.

The push rod 11 is provided with a stop 36 formed by a ring member against which is bottomed one end of a coil spring 37. The opposite end of the coil spring 37 is bottomed against one end of the sleeve member 26 as at 38. The spring 37 forms a force reaction system which operates to feed back force proportionally so long as it is supported by hydraulic pressure within the recess or chamber 31 and the sleeve member 26 is pushed against the stop 33.

During a time when there is insufficient force to act against the sleeve 26, the spool 18 will move forward whereupon the spring 37 will pick up the sleeve member 26 and will carry it along. The cavity or chamber 31 permits enough travel to bottom all of the various valve elements in the form of a solid mechanical train link against the master cylinder piston 14 and still not encounter accumulated compression forces from the excess force reaction from spring 37. In this regard, reference may be made to FIG. 2 showing the parts in shifted position.

Accordingly, in the absence of hydraulic pressure, it will be appreciated that a fail-safe push through action can occur and in accordance with the present invention, there is no accumulation of undesirable force.

The pressure created by the force of the sleeve 26 moving against hydraulic fluid during push-through can be drained off or with appropriate passages such pressure can be possibly used to supply additional force to the master cylinder piston during push through.

Although various minor modifications might be suggested by those versed in the art, it should be appreciated that we wish to embody within the scope of the patent warranted hereon all such modifications as reasonably and properly come within the scope of our contribution to the art.

We claim as our invention:

1. A hydraulic hold-off for a mechanical feedback system comprising,
    a master cylinder piston,
    a push rod for actuation by an operator,
    a hydraulic booster between said piston and said push rod comprising valve elements for controlling the application of hydraulic pressure from an external source to said master cylinder piston,
    said booster having a counterbore formed therein,
    a sleeve in said counterbore,
    a stop in the end of said counterbore engageable with said sleeve,
    one of said valve elements comprising a spool engageable with said push rod and slidable in said sleeve,
    there being an annular pressure chamber of which the end of said sleeve forms a wall so that the sleeve will be pressure-loaded against said stop when said chamber is under pressure,
    and a coil spring between said sleeve and said push rod to afford a reactive feel force to the operator when actuating the push rod,
    said spool being movable axially and said spring moving said sleeve and carrying it along to bottom the valve elements against the master cylinder piston as a solid mechanical link in the event of pressure failure of said external source.

2. An hydraulic power brake booster for applying force to a master cylinder piston comprising,
    a movable sleeve,
    means forming a valve body having a valve bore extending therethrough and forming passages and valve lands and recesses,
    a plurality of valve elements in said valve bore and cooperable with said lands and recesses to selectively apply force from a pressurized hydraulic supply to the master cylinder piston,
    said valve body having formed therein a cylinder in which said sleeve is slidably supported and in which one end of said sleeve forms a movable wall of a pressure chamber,
    thereby to pressure-load the sleeve against a stop at the end of said pressure chamber,
    a push rod adapted to be actuated by a vehicle operator,
    said valve elements including a spool engageable with said push rod and movable inside of said sleeve,
    continuous biasing means between said sleeve and said push rod and feeding back force proportionally to the push rod while it is supported by pressure in said chamber,
    said cylinder accommodating movement of said sleeve upon reduction of pressure therein so that said spool means together with said push rod and the spring form a solid mechanical train link to the master cylinder piston.

3. An hydraulic power brake booster as defined in claim 2 wherein said continuous biasing means comprises a coil spring having one end bottomed against said push rod and the opposite end bottomed against said sleeve.

4. In a power brake booster,
    a master cylinder piston and an operator-actuated push rod separated by a plurality of valve elements for controlling the application of hydraulic force from an external source to the piston and comprising,
    a movable piston element normally pressure-loaded against a stop,
    a spring between said piston element and said push rod to feed back force proportionally while supported by pressure loading of said movable piston element,
    said piston element movable away from said stop in the absence of pressure loading along with said push rod and said spring and the associated valve elements so that said valve elements form a solid mechanical link between push rod and the master cylinder piston but without encountering accumulated spring forces,
    thereby avoiding the necessity of overcoming the undesirable force of accumulated spring compression.

5. In a power brake booster as defined in claim 4 said spring comprising a coil spring disposed between said piston element and surrounding said push rod, the end of said coil spring being bottomed on said push rod.

6. An hydraulic power brake booster for applying force to a master cylinder piston comprising a movable sleeve,
    means forming a cylinder in which said sleeve is slidably supported and in which one end of said sleeve forms a movable wall of a pressure chamber, thereby to pressure-load the sleeve against a stop at the end of the chamber when pressure forces are conveyed to the pressure chamber in excess of a predetermined amount, a push rod adapted to be actuated by an operator, a continuous biasing means bottomed against the sleeve and against said push rod to feed back force proportionally to the push rod while it is supported by pressure in said pressure chamber, and a spool engaged by said push rod and movable inside of said sleeve, said cylinder accommodating movement of said sleeve when hydraulic pressure is lacking and said spool moves together with the push rod so that the spring moves the sleeve and carries it along without accumulation of undesirable spring reaction forces.

* * * * *